(12) United States Patent
Zhu et al.

(10) Patent No.: US 8,213,344 B2
(45) Date of Patent: Jul. 3, 2012

(54) METHOD AND APPARATUS FOR ANTENNA ALLOCATION ON A MULTI-RADIO PLATFORM

(75) Inventors: Jing Zhu, Hillsboro, OR (US); Xue Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 11/890,713

(22) Filed: Aug. 7, 2007

(65) Prior Publication Data

US 2009/0042555 A1    Feb. 12, 2009

(51) Int. Cl.
*H04B 7/005* (2006.01)
*H04B 1/00* (2006.01)
*H04B 17/00* (2006.01)

(52) U.S. Cl. ............... 370/278; 455/63.1; 455/67.13

(58) Field of Classification Search .......... 370/277–278; 455/63.1, 67.13
See application file for complete search history.

(56) References Cited

U.S. PATENT DOCUMENTS

| | | | |
|---|---|---|---|
| 6,185,205 B1 * | 2/2001 | Sharrit et al. | 370/389 |
| 6,560,443 B1 | 5/2003 | Vaisanen et al. | |
| 2003/0157954 A1 * | 8/2003 | Medvedev et al. | 455/522 |
| 2004/0029619 A1 | 2/2004 | Liang et al. | |
| 2004/0052504 A1 * | 3/2004 | Yamada et al. | 386/68 |
| 2005/0220079 A1 * | 10/2005 | Asokan | 370/352 |
| 2006/0025171 A1 | 2/2006 | Ly et al. | |
| 2006/0160563 A1 | 7/2006 | Ku | |
| 2006/0205363 A1 * | 9/2006 | Godfrey | 455/83 |
| 2007/0064830 A1 | 3/2007 | Choi et al. | |
| 2008/0008134 A1 * | 1/2008 | Satou et al. | 370/334 |
| 2008/0014941 A1 * | 1/2008 | Catovic et al. | 455/436 |

FOREIGN PATENT DOCUMENTS

WO   WO-2009/020955 A2   2/2009

OTHER PUBLICATIONS

International Preliminary Report on Patentability received for PCT Patent Application No. PCT/US2008/072188, mailed on Feb. 18, 2010, 6 pgs.
International Search Report and Written Opinion received for PCT Application No. PCT/US2008/072188, mailed on Jan. 30, 2009,11 pgs.
Office Action Received for German Patent Application No. 11 2008 002 097.3, mailed on Apr. 14, 2011, 7 pgs of Office Action and 6 pgs of English translation.

* cited by examiner

*Primary Examiner* — Ronald Abelson
(74) *Attorney, Agent, or Firm* — Thorpe North & Western, LLP

(57) ABSTRACT

In a multi-radio wireless device, a first radio and a second radio share a plurality of antennas. A MAC coordination engine may coordinate the activities of the first and second radios to facilitate the allocation of antennas to the radios. In at least one embodiment, the second radio is given priority over the first radio in the allocation of antennas. When the first radio desires to communicate, a number of antennas that is available for use may be determined. It may then be determined whether the communication should be permitted to proceed given the number of available antennas.

16 Claims, 2 Drawing Sheets

METHOD AND APPARATUS FOR ANTENNA ALLOCATION ON A MULTI-RADIO PLATFORM

TECHNICAL FIELD

The invention relates generally to wireless communication and, more particularly, to techniques for allocating antennas within a multiple radio platform.

BACKGROUND OF THE INVENTION

Many modern communication and/or computing devices support wireless communication for multiple different wireless standards. For example, a laptop computer may support wireless networking in accordance with both the IEEE 802.11 and IEEE 802.16 wireless networking standards. To support wireless communication, each wireless radio requires one or more antennas to transmit signals into and/or receive signals from a corresponding wireless channel. If multiple radios are permitted to share a group of antennas within a wireless device, then less antennas are required for the device and cost and size advantages may be achieved. Techniques are needed for allocating a set of antennas to multiple radios operating simultaneously within a wireless platform.

DETAILED DESCRIPTION

Figure 1:
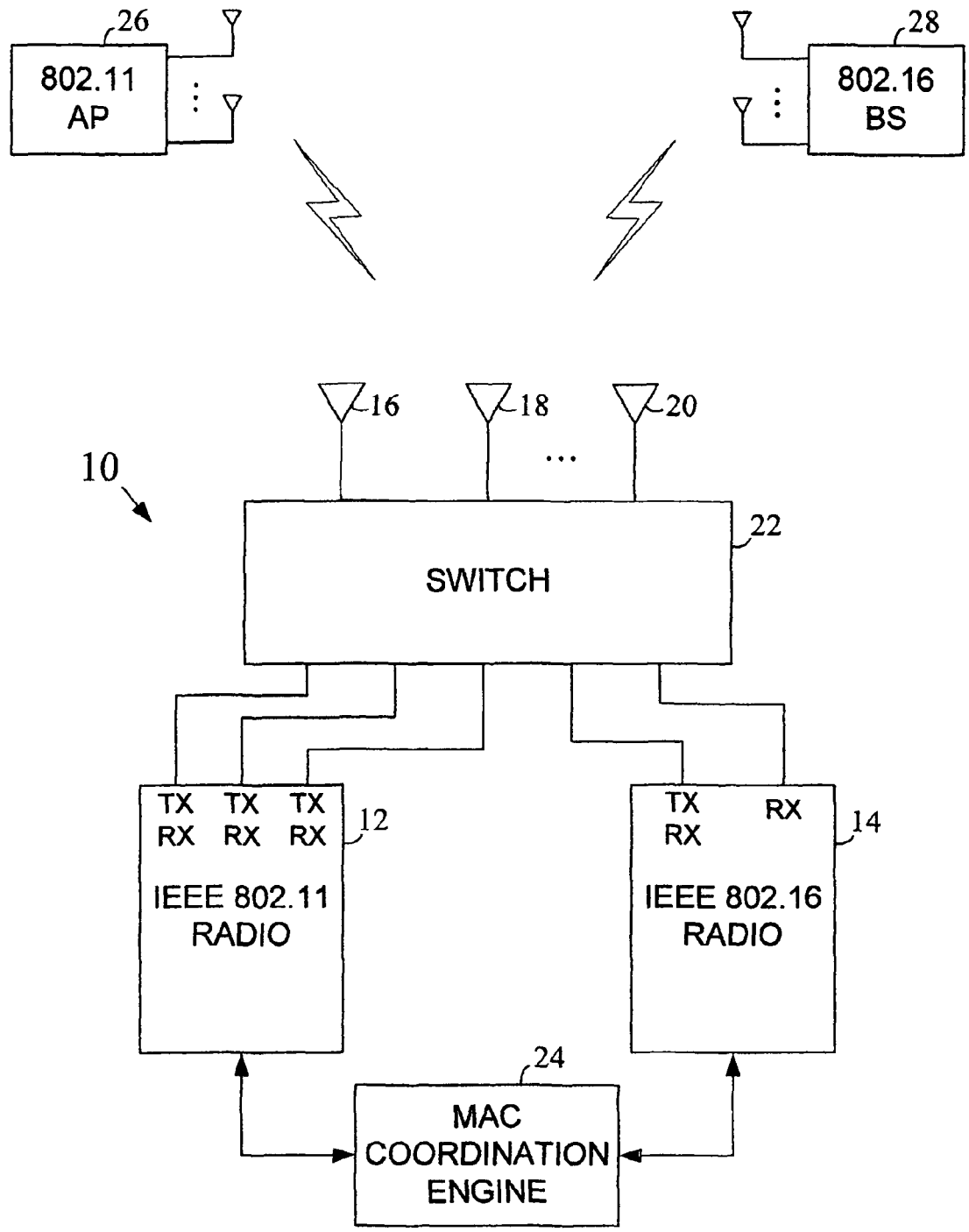
FIG. 1 is a block diagram illustrating an example multi-radio wireless device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example multi-radio wireless device 10 in accordance with an embodiment of the present invention. As illustrated, the multi-radio wireless device 10 includes: an IEEE 802.11 radio 12, a IEEE 802.16 radio 14, a number of antennas 16, 18, 20, a switch 22, and a medium access control (MAC) coordination engine 24. As will be described in greater detail, the IEEE 802.11 radio 12 and the IEEE 802.16 radio 14 share the antennas 16, 18, and 20 of the multi-radio wireless device 10 in a manner that allows concurrent operation of the two radios 12, 14 to occur in certain situations. The MAC coordination engine 24 coordinates the activities of the two radios 12, 14 to facilitate the antenna allocation function. The switch 22 is operative for controllably coupling various antenna ports of the two radios 12, 14 to corresponding allocated antennas 16, 18, 20 in response to control signals. In at least one embodiment, the switch 22 is a crossbar switch. Other types of switch may alternatively be used, including arrangements using a plurality of separate switches. Control signals for the switch 22 may be generated by the radios 12, 14, the MAC coordination engine 24, or some other control element within the device 10. As shown in FIG. 1, in one possible operational scenario, the multi-radio wireless device 10 may communicate with both an IEEE 802.11 wireless access point (AP) 26 and an IEEE 802.16 wireless base station (BS) 28 simultaneously.

In at least one embodiment of the present invention, the number of antennas that are provided on the multi-radio device 10 is related to the maximum number of antennas that may be required by the IEEE 802.11 radio 12 and the IEEE 802.16 radio 14 during operation. For example, if the maximum number of antennas that may be required by the IEEE 802.11 radio 12 is X and the maximum number of antennas that may be required by the IEEE 802.16 radio 14 is Y, then the number of antennas on the multi-radio device 10 may be made equal to X if X>Y and to X+1 if X=Y to achieve the highest level of antenna reduction. In other embodiments, a greater number of antennas may be used on the multi-radio device 10. In one approach, the IEEE 802.11 radio 12 may have at least one dedicated antenna to allow it to continuously "listen" to the wireless medium even when all of the other antennas are being used by the IEEE 802.16 radio 14. The IEEE 802.11 radio 12 may need to listen to the medium to determine the current state of the medium (e.g., either busy or idle) using carrier sensing. As used herein, the term carrier sensing may include both physical carrier sensing, where over-the-air energy is measured to determine whether or not a channel is busy, or virtual carrier sensing, where a MAC physical layer (PHY) header is received to obtain the network allocation vector (NAV) that allows the radio to mark a corresponding duration as busy. The IEEE 802.11 radio 12 may also use the dedicated antenna(s) to determine whether any signals are being transmitted to the multi-radio device 10 that need to be received.

In the illustrated embodiment, the IEEE 802.11 radio 12 may be configured in accordance with the IEEE 802.11 wireless local area network (LAN) networking standard. Any standard within the IEEE 802.11 family of standards may be supported (e.g., IEEE 802.11, IEEE 802.11a, IEEE 802.11b, IEEE 802.11g, IEEE 802.11e, IEEE 802.11n, etc.). The IEEE 802.16 radio 14 may be configured in accordance with the IEEE 802.16 wireless metropolitan area network (MAN) networking standard. Although illustrated with an IEEE 802.11 radio 12 and an IEEE 802.16 radio 14, it should be appreciated that the multi-radio wireless device 10 may include radios following other wireless networking standards and/or wireless cellular standards in other embodiments. The IEEE 802.11 radio 12 and the IEEE 802.16 radio 14 may each include one or more dedicated digital processing devices (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above) to provide control for the radios 12, 14. The multi-radio device 10 may also include a host processor and/or one or more secondary processors (not shown) to provide control functionality and program execution functionality for the device 10. The IEEE 802.11 radio 12 and the IEEE 802.16 radio 14 may be separate components (e.g., separate transceiver chips, separate wireless network interface cards (NICs), separate boards, etc.) or they may be implemented as part of a common structure (e.g., a common semiconductor chip, a common NIC, etc.). Likewise, the MAC coordination engine 24 may be implemented as a separate entity (e.g., a separate chip, as executed code within the host processor, etc.) or as part of the same structure as one or both of the radios 12, 14.

The multi-radio wireless device 10 may include any type of device that has multiple radios on a single platform. This may include, for example, laptop, palmtop, desktop, and tablet computers; personal digital assistants (PDAs); cellular telephones and other handheld wireless communicators; pagers; satellite communicators; cameras having wireless capability; audio/video devices having wireless capability; appliances having wireless capability; network interface cards; base stations; wireless access points; integrated circuits; and/or others.

In at least one embodiment of the present invention, the MAC coordination engine 24 gives antenna priority to the IEEE 802.16 radio 14. That is, the IEEE 802.16 radio 14 will be allowed to use as many antennas as it desires without regard to the needs of the IEEE 802.11 radio 12 (i.e., other than the dedicated 802.11 antenna(s)). In one such approach, for example, the MAC coordination engine 24 will monitor the IEEE 802.16 radio 14 and gather operational information from the IEEE 802.16 radio 14 whenever an IEEE 802.16 frame header is received thereby (e.g., from the DL and UL MAP). The information that is gathered may include, for example, the starting time of a downlink burst to be received by the multi-radio device 10, the duration of the downlink burst, the number of antennas to use to receive the downlink burst, the starting time of an uplink burst to be transmitted from the multi-radio device 10, the duration of the uplink burst, the number of antennas to used to transmit the uplink burst, and the starting time of the next frame. This information allows the MAC coordination engine 24 to determine how many antennas will be used by the IEEE 802.16 radio 14 and when they will be used. The MAC coordination engine 24 can then use this information to determine how many antennas are available for use by the IEEE 802.11 radio 12. Alternatively, the MAC coordination engine 24 can deliver this information to the IEEE 802.11 radio 12 and allow the radio to determine how many antennas are available for use.

In one implementation, the number of antennas that are available for use by the IEEE 802.11 radio 12 is equal to the total number of antennas within the multi-radio device 10 less the number of antennas being used by the IEEE 802.16 radio 14. For example, if n is the total number of antennas within a multi-radio device, and the number of antennas allocated for IEEE 802.16 transmission is a, then the number of antennas available for simultaneous IEEE 802.11 transmission is n-a. Similarly, if the number of antennas allocated for IEEE 802.16 reception is b, then the number of antennas available for simultaneous IEEE 802.11 reception is n-b. When the IEEE 802.16 radio is idle, then all n of the antennas are available for use by the IEEE 802.11 radio for transmission, reception, or carrier sensing.

When it is time for the IEEE 802.11 radio to transmit or receive, the radio 12 (or the MAC coordination engine 24) may first determine the number of antennas that are currently available for use by the radio 12. The IEEE 802.11 radio 12 (or the MAC coordination engine 24) may then determine whether the number of antennas that are currently available for use by the radio 12 is adequate to reliably perform the transmit or receive operation. To determine whether the number of antennas that are currently available for use by the radio 12 is adequate to reliably perform the transmit or receive operation, the number may be compared to a minimum number of antennas that are required to reliably perform the operation. The minimum number of antennas required to reliably perform the operation may be determined by determining the minimum number of antennas that is required to achieve a predetermined performance level given the current channel conditions. This minimum number of required antennas may change with time based on changing channel conditions.

The IEEE 802.11 radio 12 (or the MAC coordination engine 24) may also determine whether performance of the IEEE 802.11 transmit or receive operation will result in any mismatched communication overlap with scheduled IEEE 802.16 communication operations. Mismatched communication overlap may include, for example, the IEEE 802.11 radio transmitting when the IEEE 802.16 radio is receiving or the IEEE 802.16 radio transmitting when the IEEE 802.11 radio is receiving. Such communication overlap can generate interference within one or both of the radios that can degrade communication performance. If the number of available antennas is not enough to perform the associated transmit or receive function, or if there is mismatched communication overlap, then the IEEE 802.11 radio 12 may postpone its transmit or receive operation to a later time. Otherwise, the IEEE 802.11 radio 12 will perform the associated operation using the available antennas.

Figure 2:
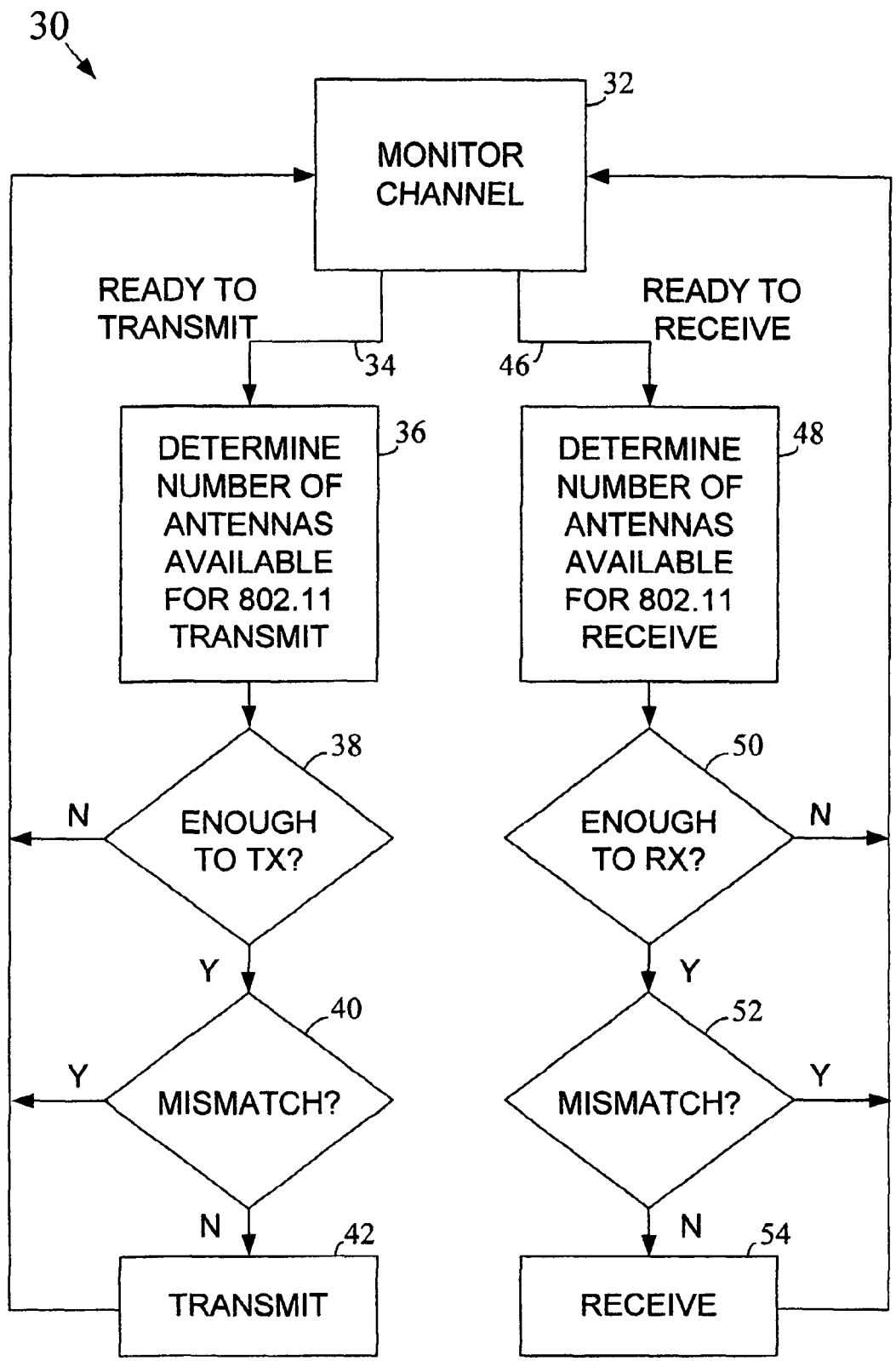
FIG. 2 is a flowchart illustrating an example method for operating a radio within a multi-radio device in accordance with an embodiment of the present invention.

FIG. 2 is a flowchart illustrating an example method 30 for operating a radio within a multi-radio device in accordance with an embodiment of the present invention. In the description that follows, the method 30 will be described in connection with an IEEE 802.11 based radio in a multi-radio device that also includes an IEEE 802.16 radio. It should be appreciated, however, that radios following other wireless standards may be used in other embodiments. The IEEE 802.11 radio monitors a wireless communication channel to determine the state of the channel (e.g., busy or idle) and to determine whether any transmissions within the channel are addressed to it (block 32). This monitoring may be performed using one or more antennas dedicated for use with IEEE 802.11. During this monitoring process, the IEEE 802.11 radio may determine that it is ready to transmit data into the channel or ready to receive data from the channel.

Referring to FIG. 2, if the IEEE 802.11 radio determines that it is ready to transmit data into the channel (path 34), the number of antennas within the multi-radio device that are currently available for IEEE 802.11 transmission may be determined (block 36). As described previously, in at least one embodiment, the number of antennas that are available for IEEE 802.11 transmission may be the total number of antennas within the multi-radio device less the number of antennas being used by (or scheduled to be used by) the IEEE 802.16 radio. After the number of available antennas has been determined, it may next be determined whether the number of available antennas is enough to perform the associated transmit operation (block 38). For example, a minimum number of antennas may be required to perform a particular transmit operation due to, for example, current channel conditions. If the number of available antennas is greater than or equal to the minimum number, there are enough antennas available to perform the transmit operation. The minimum number of antennas required to perform transmit operations may change with time based on changing channel conditions.

In addition to the above, it may also be determined whether the desired IEEE 802.11 transmission will generate any mismatched communication overlaps if allowed to occur, as described previously (block 40). If there are enough available antennas (block 38-Y) and no mismatched overlaps will occur (block 40-N), then the IEEE 802.11 transmit operation will be permitted to occur using the available antennas (block 42). Otherwise, the IEEE 802.11 radio will go directly back to the monitoring function of block 32 and the transmit operation will be postponed.

In a similar fashion, if the IEEE 802.11 radio determines that it is ready to receive data from the channel (path 46 in FIG. 2), the number of antennas within the multi-radio device that are available for IEEE 802.11 reception may be determined (block 48). As described previously, the number of antennas that are available for IEEE 802.11 reception may be the total number of antennas within the multi-radio device less the number of antennas currently being used by (or scheduled to be used by) the IEEE 802.16 radio. It may also be determined whether the number of antennas that are available is enough to perform the IEEE 802.11 receive operation (block 50). For example, a minimum number of antennas may be required to perform a particular receive operation due to, for example, current channel conditions. If the number of available antennas is greater than or equal to the minimum number, there are enough antennas available to perform the receive operation. The minimum number of antennas required to perform a receive operation may change with time based on changing channel conditions.

In addition to the above, it may be determined whether the desired IEEE 802.11 receive operation will generate any mismatched communication overlaps if allowed to occur (block 52). If there are enough available antennas to receive (block 50-Y) and no mismatched overlaps will occur (block 52-N), then the receive operation will be permitted to occur using the available antennas (block 54). Otherwise, the IEEE 802.11 radio will go directly back to the monitoring function of block 32 and the IEEE 802.11 receive operation will be postponed.

In at least one embodiment of the invention, the IEEE 802.11 radio may determine that it is "ready to transmit" (path 34 of FIG. 2) when: (a) the radio has data buffered for transmission, (b) the radio has determined that the channel is idle (e.g., using physical carrier sensing and/or virtual carrier sensing), and (c) the radio has waited a pseudo random back-off interval during which time the channel remains idle. Other techniques for determining that the IEEE radio is ready to transmit may alternatively be used. In at least one embodiment of the invention, the IEEE 802.11 radio may determine that it is "ready to receive" (path 46 in FIG. 2) when the radio receives a request-to-send (RTS) frame from another wireless entity (e.g., an IEEE 802.11 AP) that wishes to transmit data to the radio. In such a case, the IEEE 802.11 radio may first check the number of available antennas, determine whether the number is enough, and determine whether any mismatched communication overlaps will occur, before making the decision to send back a clear-to-send (CTS) frame to the requesting wireless entity. If there are not enough antennas available to receive or if mismatched overlaps will occur, then the IEEE 802.11 radio may decide not to send back a CTS frame and the receive operation will be postponed. The IEEE 802.11 radio may then return to the monitoring function of block 32. In some other embodiments, the IEEE 802.11 radio may determine that it is "ready to receive" when it receives the header of a frame. In such a case, the radio may decide not to continue with the receive operation if an insufficient number of antennas are available or if a mismatched overlap will occur. Other techniques for determining that the IEEE 802.11 radio is ready to receive may alternatively be used.

In general, when determining the number of antennas that are available for use by the IEEE 802.11 radio (e.g., in blocks 36 and 48 in FIG. 2), the entire duration of the desired IEEE 802.11 transmit or receive operation should be considered. Thus, the IEEE 802.11 radio (or the MAC coordination engine) should determine how long the operation will last and then determine the maximum number of antennas that will be used by the IEEE 802.16 during this time period (i.e., the number of antennas used by the IEEE 802.16 radio may change during the IEEE 802.11 transmit or receive operation). This maximum number may then be used to determine the number of antennas available for the IEEE 802.11 radio.

In at least one embodiment of the invention, all of the acts illustrated in FIG. 2 are performed by the IEEE 802.11 radio. In other embodiments, one or more of the acts may be performed by the MAC coordination engine 24 (see FIG. 1) or some other control entity within the multi-radio wireless device.

In at least one embodiment of the present invention, features of the invention are implemented as instructions stored on a computer readable medium. Examples of different types of computer readable media that may be used include, for example, floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   when a first radio within a multi-radio wireless device is ready to transmit data to a remote entity, determining a number of antennas within said multi-radio wireless device that are available for use by said first radio using a medium access control (MAC) coordination engine, wherein said number of antennas that are available for use by said first radio is determined based on a total number of antennas within said multi-radio wireless device minus a number of antennas scheduled for use by a second radio within said multi-radio device;
   determining at the MAC coordination engine whether said number of antennas that are available for use by said first radio is adequate to reliably transmit said data to said remote entity based on channel conditions for the first radio;
   determining at the MAC coordination engine whether there would be temporal overlap between a transmission of said first radio and a reception of said second radio should said first radio be permitted to transmit; and when said number of antennas that are available for use by said first radio is adequate to reliably transmit said data to said remote entity based on the channel conditions for the first radio and there would be no temporal overlap between said transmission of said first radio and a reception of said second radio, wherein said MAC coordination engine is configured to enable allowing said first radio to transmit data to said remote entity using available antennas where said second radio is configured to transmit data while the first radio is transmitting data.

2. The method of claim 1, wherein:
said first radio is configured in accordance with an IEEE 802.11 wireless networking standard and said second radio is configured in accordance with an IEEE 802.16 wireless networking standard.

3. The method of claim 1, wherein:
determining whether said number of antennas that are available for use by said first radio is adequate to reliably transmit said data to said remote entity includes determining a minimum number of antennas that is required to reliably transmit data to said remote entity and comparing said number of antennas that are available for use by said first radio to said minimum number.

4. The method of claim 1, further comprising:
when said first radio within said multi-radio wireless device is ready to receive data from a remote entity, determining a number of antennas that are available for use by said first radio, wherein said number of antennas that are available for use by said first radio is determined based on a total number of antennas within said multi-radio wireless device and a number of antennas scheduled for use by said second radio within said multi-radio device;
determining whether said number of antennas that are available for use by said first radio is adequate to reliably receive data from said remote entity;
determining whether there would be temporal overlap between a reception of said first radio and a transmission of said second radio should said first radio be permitted to receive said data from said remote entity; and
when said number of antennas that are available for use by said first radio is adequate to reliably receive data from said remote entity and there would be no temporal overlap between a reception of said first radio and a transmission of said second radio, allowing said first radio to receive data from said remote entity using available antennas.

5. The method of claim 1, wherein:
determining a number of antennas that are available for use by said first radio includes collecting from said second radio information about a number of antennas that said second radio is scheduled to use and information about the timing of said scheduled use of said antennas by said second radio.

6. An apparatus comprising:
a first radio;
a second radio;
a plurality of antennas;
a switch coupled to said first radio, said second radio, and said plurality of antennas to controllably couple antenna ports of said first and second radios to selected antennas within said plurality of antennas; and
a medium access control (MAC) coordination engine to coordinate the activity of said first and second radios to determine a number of the plurality of antennas that are scheduled for use by the second radio and select a remaining number of antennas as available antennas for use with the first radio, wherein said MAC coordination engine is configured to enable the first radio to transmit when said available number of antennas that are available for use by said first radio are adequate to reliably transmit data to a remote entity using the available antennas based on channel conditions for the first radio where said second radio is configured to transmit data while the first radio is transmitting data.

7. The apparatus of claim 6, wherein:
said first radio is configured in accordance with the IEEE 802.11 wireless networking standard and said second radio is configured in accordance with the IEEE 802.16 wireless networking standard.

8. The apparatus of claim 6, wherein:
at least one antenna within said plurality of antennas is dedicated for use by said first radio to monitor a corresponding wireless channel.

9. The apparatus of claim 6, wherein:
when said first radio determines that it is ready to transmit data to a remote entity, said first radio is to:
determine a number of antennas within said plurality of antennas that are available for use by said first radio;
determine whether said number of antennas that are available for use by said first radio is adequate to reliably transmit said data to said remote entity;
determine whether there will be any temporal overlap between a transmission of said first radio and a reception of said second radio should said data be transmitted to said remote entity; and
when said number of antennas that are available for use by said first radio is adequate to reliably transmit said data to said remote entity and there will be no temporal overlap between a transmission of said first radio and a reception of said second radio, allow said data to be transmitted to said remote entity using available antennas.

10. The apparatus of claim 9, wherein said first radio is to:
when said number of antennas that are available for use by said first radio is not adequate to reliably transmit said data to said remote entity or there will be temporal overlap between a transmission of said first radio and a reception of said second radio, postpone transmission of said data to said remote entity.

11. The apparatus of claim 6, wherein:
when said first radio determines that it is ready to receive data from a remote entity, said first radio is to:
determine a number of antennas within said plurality of antennas that are available for use by said first radio;
determine whether said number of antennas that are available for use by said first radio is adequate to reliably receive said data from said remote entity;
determine whether there will be any temporal overlap between a reception of said first radio and a transmission of said second radio should said data be received from said remote entity; and
when said number of antennas that are available for use by said first radio is adequate to reliably receive said data from said remote entity and there will be no temporal overlap between a reception of said first radio and a transmission of said second radio,
allow said data to be received from said remote entity using available antennas.

12. The apparatus of claim 11, wherein said first radio is to:
when said number of antennas that are available for use by said first radio is not adequate to reliably receive said data from said remote entity or there will be temporal overlap between a reception of said first radio and a transmission of said second radio, postpone reception of said data from said remote entity.

13. The apparatus of claim 6, wherein:
the maximum number of antennas that said first radio will require to communicate is X and the maximum number of antennas that said second radio will require to communicate is Y, where X=Y;
wherein a total number of antennas within said apparatus is X+1.

14. The apparatus of claim 6, wherein:
the maximum number of antennas that said first radio will require to communicate is X and the maximum number of antennas that said second radio will require to communicate is Y, where X>Y;
wherein a total number of antennas within said apparatus is X.

15. An article comprising a computer readable storage medium having instructions stored thereon that, when executed by a computing device, operate to:
when a first radio within a multi-radio wireless device is ready to transmit data to a remote entity, determine a number of antennas within said multi-radio wireless device that are available for use by said first radio using a medium access control (MAC) coordination engine, wherein said number of antennas that are available for use by said first radio is determined based on a total number of antennas within said multi-radio wireless device minus a number of antennas scheduled for use by a second radio within said multi-radio device;
determine at the MAC coordination engine whether said number of antennas that are available for use by said first radio is adequate to reliably transmit said data to said remote entity based on channel conditions for the first radio;
determine at the MAC coordination engine whether there would be temporal overlap between a transmission of said first radio and a reception of said second radio should said first radio be permitted to transmit; and
when said number of antennas that are available for use by said first radio is adequate to reliably transmit said data to said remote entity based on the channel conditions for the first radio and there would be no temporal overlap between said transmission of said first radio and a reception of said second radio, wherein said MAC coordination engine is configured to enable allow said first radio to transmit said data to said remote entity using available antennas where said second radio is configured to transmit data while the first radio is transmitting data.

16. The article of claim 15, wherein said instructions, when executed by said computing device, further operate to:
when said first radio within said multi-radio wireless device is ready to receive data from a remote entity, determine a number of antennas that are available for use by said first radio, wherein said number of antennas that are available for use by said first radio is determined based on a total number of antennas within said multi-radio wireless device and a number of antennas scheduled for use by said second radio within said multi-radio device;
determine whether said number of antennas that are available for use by said first radio is adequate to reliably receive data from said remote entity;
determine whether there would be temporal overlap between a reception of said first radio and a transmission of said second radio should said first radio be permitted to receive said data from said remote entity; and
when said number of antennas that are available for use by said first radio is adequate to reliably receive data from said remote entity and there would be no temporal overlap between a reception of said first radio and a transmission of said second radio, allowing said first radio to receive data from said remote entity using available antennas.

\* \* \* \* \*